Aug. 13, 1929.  L. SAIVES  1,724,423
SHOCK ABSORBER
Filed April 20, 1922  2 Sheets-Sheet 1

INVENTOR
Leon Saives
By Chas J. O'Neill
ATTORNEY

Aug. 13, 1929.  L. SAIVES  1,724,423
SHOCK ABSORBER
Filed April 20, 1922  2 Sheets-Sheet 2

INVENTOR
Leon Saives
By Chas J. Neill
ATTORNEY

Patented Aug. 13, 1929.

1,724,423

UNITED STATES PATENT OFFICE.

LÉON SAIVES, BILLANCOURT, FRANCE, ASSIGNOR TO LOUIS RENAULT, OF BILLANCOURT, SEINE, FRANCE.

SHOCK ABSORBER.

Application filed April 20, 1922, Serial No. 555,761, and in France November 29, 1921.

The present invention relates to shock absorbers which are placed between the chassis and the axles of an automobile or other vehicle, and the invention relates more particularly to an arrangement for adjusting the shock absorber in such manner as to impart thereto at any desired moment an adjustment corresponding to the load or to the state of the road on which the vehicle travels. By means of a fluid transmission arrangement under pressure the adjustment of the shock absorber can be effected at any desired moment and the said arrangement can be controlled either by the chauffeur or automatically by the vehicle itself. The adjusting arrangement is based on the use of a fluid pump which can be controlled directly by the chauffeur or automatically, as hereinbefore stated, by a member deriving its rotational movement from the vehicle in such manner that the pressure of the controlling fluid may act in accordance with the speed of the vehicle. The invention further relates to certain detailed arrangements and modifications which are hereinafter fully described.

In order that the invention may be clearly understood reference is made to the accompanying drawing which shows by way of example a constructional form in accordance with the present invention.

Figure 7:
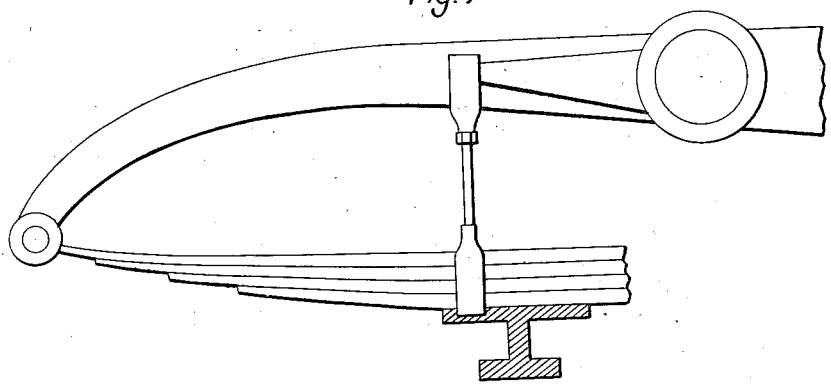
Figure 8:
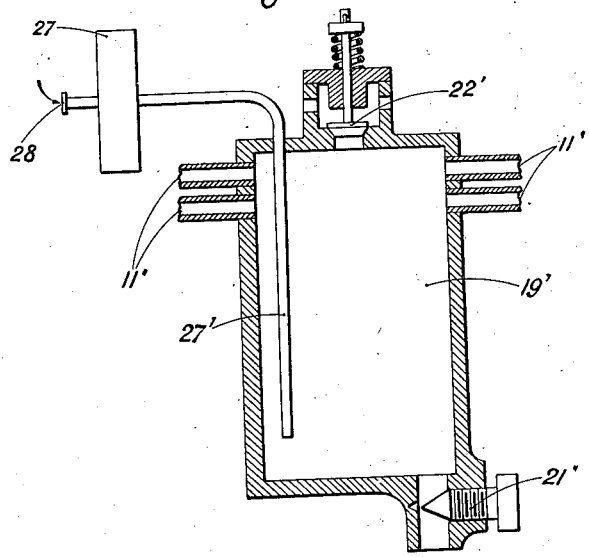

Figures 7 and 8 apply to a modified form of the invention.

Figure 1:
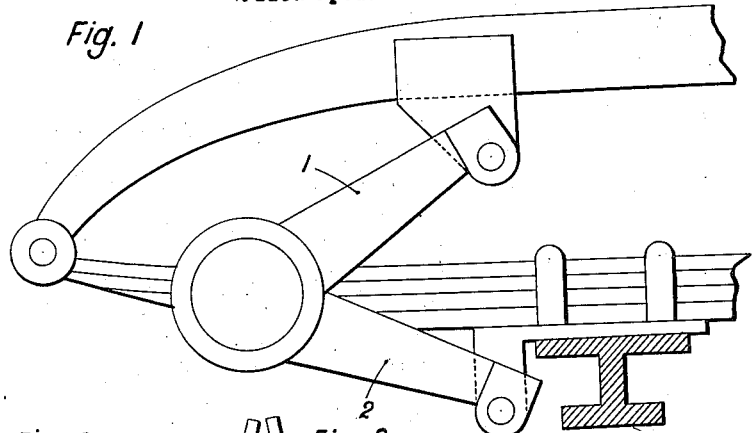
Figure 1 is a view of an existing type of disc shock absorber mounted on an automobile vehicle.
Figure 2:
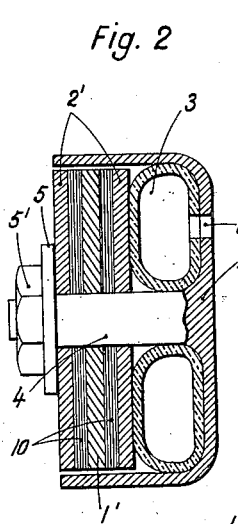
Figure 2 is a section through the axis of a disc shock absorber provided with a controlling arrangement in accordance with the present invention.

Referring to Figure 2 it will be seen that the shock absorber is of the disc type and comprises essentially in the constructional form shown arms 1, 2 articulated respectively on the chassis and on the axle. The arm 1 is rigidly connected to a disc 1' and to the arm 2 to the two discs 2' enclosing the disc 1'; these discs are mounted on a pin 4 integral with or rigidly connected to a box-like casing 4' enclosing the discs between which are provided suitable washers or spacing members 10. An annular chamber 3 of elastic material is provided in the space between the inner disc 2' and the bottom of the box-like casing 4' which chamber communicates by an opening 6 with a pump hereinafter described.

Figure 3:
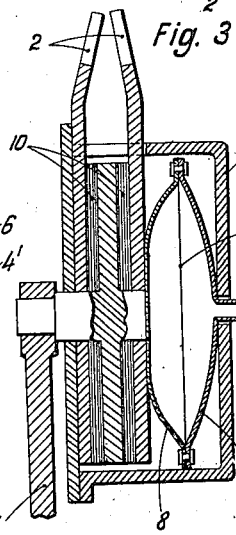
Figure 3 shows a modified constructional form of the controlling arrangement indicated in Figure 2.
Figure 4:
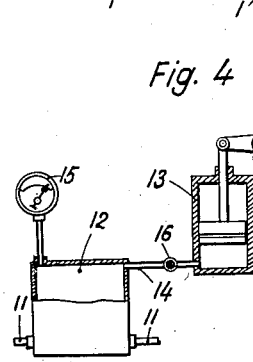
Figure 4 is a view of a pump intended to obtain the pressure of the fluid.

In the constructional form shown in Figure 3 the resilient annular chamber 3 is replaced by a chamber closed by two elastic membranes or diaphragms 8, 8' connected together in any suitable manner. The interior capacity of this closed chamber formed by the membranes or diaphragms is in communication with the pump by an axial pipe 11. Figure 4 shows diagrammatically a pump arrangement which permits of the use of a fluid under pressure in the closed chambers 3 and 8, 8'. A hand pump, for example indicated at 13, may be used to compress the fluid in a reservoir or tank 12 provided with an arrangement adapted to indicate the pressure or with a manometer 15. The reservoir or tank is in communication by tubes 11 with different shock absorbing arrangements mounted on the vehicle. By means of a tube 14 the pump 13 can be placed in communication with the reservoir 12 and by means of a multiple-way cock or tap 16 communication may be effected either between the reservoir or tank and the pump or between the reservoir or tank and the atmosphere. A suitable lever employed on the piston of the pump 13 is arranged within reach of the chauffeur so as to permit the latter to control the pressure of the fluid transmitted to the shock absorber in accordance with the load on the vehicle or according to the nature of the road on which the vehicle travels.

Figure 5:
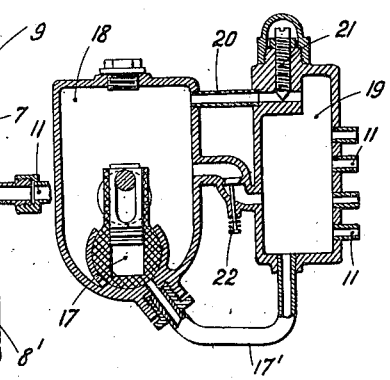
Figure 5 is a diagrammatic view of a pump actuated by the vehicle and adapted to give automatic control for the adjustment of the shock absorber.

Figure 5 represents a pump actuated by a member deriving its rotation from the vehicle, for example from a wheel of the vehicle. The pump is of the oscillating type as indicated at 17 and the said pump is mounted in the interior of a closed chamber 18 containing a suitable liquid. The pump delivers liquid through a tube 17' to a reservoir or tank 19 on which are branched the various tubes 11 which are in communication with the shock absorbers. A return tube 20 effects communication between the reservoir 19 and the reservoir 18 and an adjusting member such as a pointed screw is disposed in the passage 20. A direct return passage provided with a safety valve 22 is also disposed between the reservoirs 18 and 19.

It will be easily understood that the liquid in the circuit and the reservoirs 18 and 19 returns to the feed reservoir 18 by the passage 20. When the speed of the vehicle increases the supply from the pump overflows the conduit 20, the pressure in the reservoir 19 increases and is therefore a function of the speed of the vehicle. This pressure is transmitted by the tubes 11 to the different shock absorbers.

If, from any cause whatsoever, the passages become obstructed or the speed of the vehicle becomes too great, the pressure would be increased to an abnormal degree in the interior of the reservoir 19 and the liquid in this reservoir would return to the feed reservoir 18 through the direct passage in which is situated the safety valve 22 which would therefore be opened by reason of the abnormal pressure.

It will be seen therefore that the pressure in the interior of the reservoir 19 and consequently on the shock absorbing arrangement will depend on the speed of rotation of the pump 17. Automatic adjustment of the cushioning or damping effect of the shock absorber is thus obtained which adjustment is a function of the speed of the vehicle.

Figure 6:
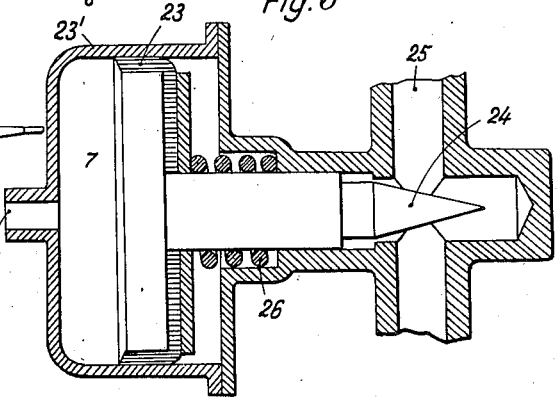
Figure 6 is a view of an automatically controlled adjusting member applied to a hydraulic shock absorber of an existing type.

Figure 6 shows an adjusting arrangement according to the invention applied to shock absorbers of a type other than the disc type, such for example, as a hydraulic type of shock absorber. It is known that in the latter type of shock absorbers the adjustment of the apparatus is effected by obstructing more or less the passage through which the liquid circulates. 25 indicates such a passage for the circulation of the liquid and in this passage is mounted a needle valve 24 or the like intended to close more or less the cross sectional area of the passage. The needle valve 24 is integral with or rigidly connected to a piston 23 which is displaceably disposed in a cylinder 23', fluid under pressure being admitted to the said cylinder through the tube 11. The piston 23 is subjected to the action of a spring 26 which constantly tends to move the piston 23 towards the exterior, the position which corresponds to the open position of the needle valve 24.

It will be understood that the pressure when transmitted through the tube 11 to the interior of the cylinder 23' will displace the piston 23 against the action of the spring 26 and will close more or less the passage 25 for the circulation of the liquid.

It should be understood that the adjustment can be effected either by hand or automatically by means of the apparatus hereinbefore described. The invention is therefore characterized by a method of adjusting shock absorbers used in the suspension of automobile and other vehicles and consists in utilizing fluid under pressure which fluid acts on the member for adjusting the shock absorber by suitable intermediate means. The pressure of the fluid is obtained either directly or by means of a hand pump or indirectly by a pump driven by the vehicle.

The governing arrangement just described is applicable to shock absorbers of the existing disc type, for example, those which comprise two arms; a modified arrangement shown in Figures 7 and 8 applies to shock absorber which comprises only one arm, half of the discs being then rigid with the chassis and the single arm being connected to the other half of the discs and to the axle by a suitable lever.

The air which is required to serve for the variable compression of the discs is drawn in at 28 by a compressor 27 and delivered into the chamber 19' corresponding to that described above and comprising the piping 11', 11', which connects with the shock absorbers; the said compressor is naturally always driven by the shaft from the vehicle constantly rigid with the wheels. The supply pipe 27' which descends to a suitable distance into the chamber 19' acts as a decanter for the oil which may be delivered from the compressor, the said oil collecting in the lower part of the reservoir from whence it escapes with the air through a discharge opening in the bottom controlled by a screw plug 21'.

Entry of the oil into the chambers provided in the body of the shock absorbers for the compression of the discs is thus avoided and the deterioration of the said chambers is prevented when the latter are made of a material such as rubber, for example, which is capable of being injuriously affected by the oil.

The safety valve 22 is provided so as to be able to adjust the pressure in the governing members to a suitable maximum.

Claims:

1. A shock absorber for vehicles comprising motion-resisting means, fluid-actuated means for varying the intensity of said motion-resisting means, and means actuated by the vehicle for supplying fluid under pressure to said fluid actuated means.

2. A shock absorber for vehicles comprising motion-resisting means, fluid-actuated means for varying the intensity of said motion-resisting means, means for supplying fluid under pressure to said fluid actuated means, the pressure of said fluid varying in accordance with the speed of the vehicle.

3. A shock absorber comprising two connected members coacting to frictionally resist movement thereof, fluid pressure-actuated means operatively connected to said members for varying the frictional resistance, a fluid pressure reservoir, and means connecting said reservoir with said fluid pressure-actuated means.

In testimony whereof I affix my signature.

LÉON SAIVES.